(12) United States Patent
Rhoden

(10) Patent No.: US 8,984,856 B2
(45) Date of Patent: Mar. 24, 2015

(54) FLEXIBLE FUEL SYSTEM

(75) Inventor: William E. Rhoden, Glastonbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1080 days.

(21) Appl. No.: 13/020,178

(22) Filed: Feb. 3, 2011

(65) Prior Publication Data

US 2011/0247315 A1    Oct. 13, 2011

Related U.S. Application Data

(60) Provisional application No. 61/323,022, filed on Apr. 12, 2010.

(51) Int. Cl.
  *F02C 9/00* (2006.01)
  *F02C 9/40* (2006.01)

(52) U.S. Cl.
  CPC .................................. *F02C 9/40* (2013.01)
  USPC .................. 60/39.281; 60/243; 60/734

(58) Field of Classification Search
  USPC ............ 60/233, 243, 776, 790, 734, 39.281
  See application file for complete search history.

(56) References Cited

U.S. PATENT DOCUMENTS

| | | | |
|---|---|---|---|
| 4,193,291 A | 3/1980 | Lynnworth | |
| 4,450,820 A | 5/1984 | Haynes | |
| 4,508,127 A * | 4/1985 | Thurston | 137/8 |
| 5,063,734 A * | 11/1991 | Morris | 60/204 |
| 5,115,635 A | 5/1992 | Jennings et al. | |
| 5,284,120 A | 2/1994 | Fukushima et al. | |
| 6,209,309 B1 | 4/2001 | McArthur | |
| 6,401,446 B1 | 6/2002 | Gibbons | |
| 6,912,918 B1 | 7/2005 | Lynnworth et al. | |
| 7,251,925 B2 | 8/2007 | Paradise | |
| 7,600,417 B2 | 10/2009 | Paradise | |
| 2003/0205042 A1* | 11/2003 | Walker et al. | 60/204 |
| 2006/0272313 A1* | 12/2006 | Eick et al. | 60/39.63 |
| 2007/0006591 A1* | 1/2007 | Spadaccini et al. | 60/772 |
| 2007/0108202 A1* | 5/2007 | Kinzer | 219/772 |
| 2007/0113560 A1* | 5/2007 | Steber et al. | 60/773 |
| 2008/0163931 A1 | 7/2008 | Brocard et al. | |
| 2008/0183362 A1* | 7/2008 | Dooley et al. | 701/100 |
| 2008/0262701 A1* | 10/2008 | Williams et al. | 701/103 |
| 2008/0289339 A1* | 11/2008 | Asti et al. | 60/734 |
| 2009/0299609 A1* | 12/2009 | Gokhale | 701/105 |
| 2010/0162678 A1* | 7/2010 | Annigeri et al. | 60/39.281 |

\* cited by examiner

*Primary Examiner* — Phutthiwat Wongwian
*Assistant Examiner* — Scott Walthour
(74) *Attorney, Agent, or Firm* — Carlson, Gaskey & Olds, P.C.

(57) ABSTRACT

An example fuel system includes a fuel sensor configured to sense at least one characteristic of a fuel provided to an engine. The fuel is selected from a plurality of different fuel types. The fuel system also includes a controller that is configured to meter the fuel in response to the at least one characteristic of the fuel.

2 Claims, 2 Drawing Sheets

FLEXIBLE FUEL SYSTEM

CROSS-REFERENCE TO RELATED APPLICATIONS

This disclosure claims priority to U.S. Provisional Application No. 61/323,022, which was filed on 12 Apr. 2010 and is incorporated herein by reference.

BACKGROUND

This disclosure relates to a gas turbine engine and, more particularly, to a flexible fuel system for a gas turbine engine.

Aerospace gas turbine engines must operate at high efficiencies to compete in today's environment. Also, high fuel prices and regulations drive engine makers and aircraft manufacturers to improve gas turbine engine efficiency and reduce fuel burn.

SUMMARY

An example fuel system includes a fuel sensor configured to sense at least one characteristic of a fuel provided to an engine. The fuel is selected from a plurality of different fuel types. The fuel system also includes a controller that is configured to meter the fuel in response to the at least one characteristic of the fuel.

An example gas turbine engine fuel system includes a conduit configured to deliver a flow of fuel from a fuel supply to a combustor of a gas turbine engine. The flow of fuel is selected from different fuel types. A fuel sensor is configured to determine the energy content of the fuel. A controller is configured to meter the flow of fuel in response to the energy content of the fuel.

An example fuel delivery method includes delivering a flow of fuel to an engine. The fuel is selected from different fuel types. The method senses an energy density of the fuel. The method adjusts the flow of fuel based on the energy density of the fuel.

The various features and advantages of the disclosed examples will become apparent to those skilled in the art from the detailed description. The figures that accompany the detailed description can be briefly described as follows.

DETAILED DESCRIPTION

Figure 1:
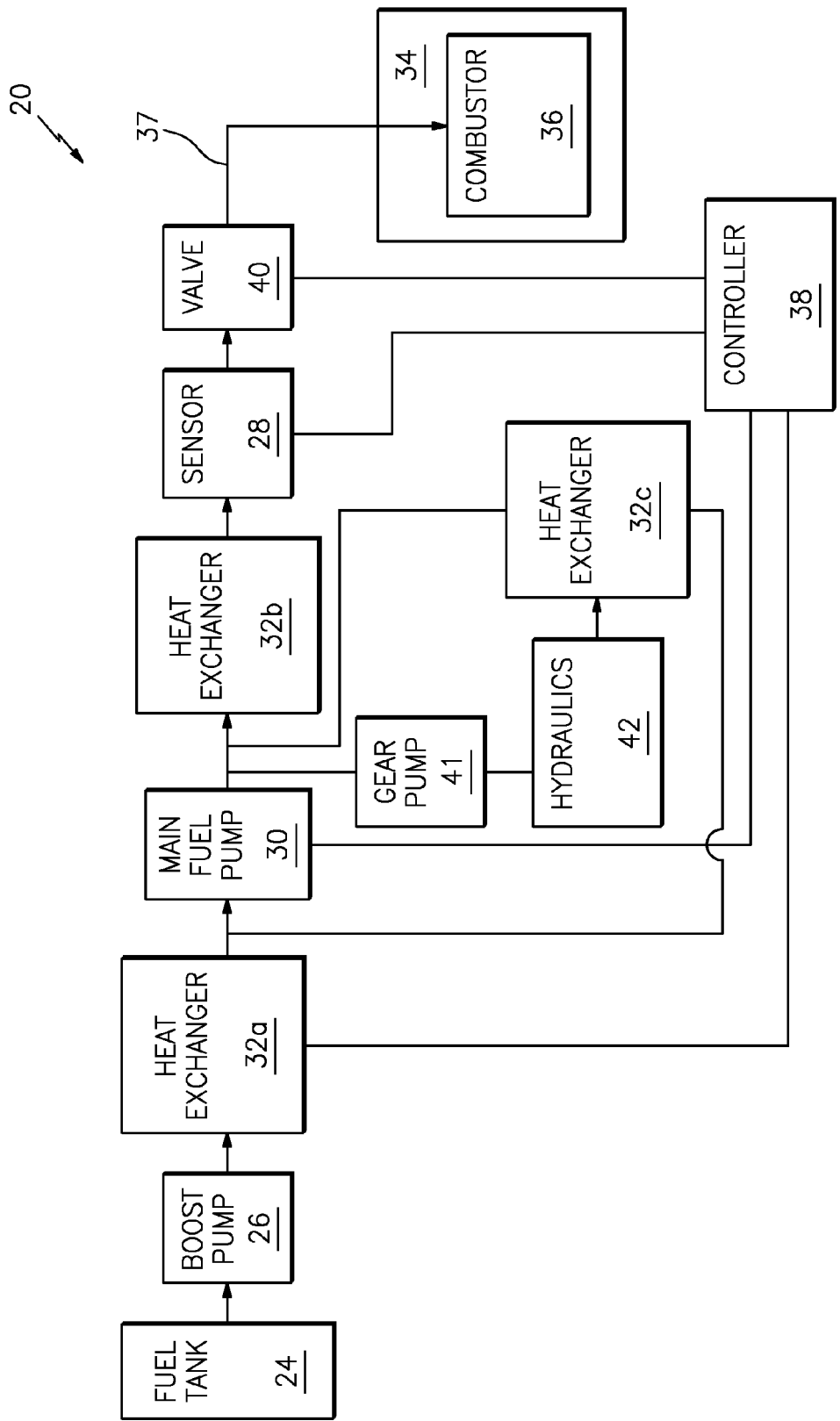
FIG. 1 is a schematic view of a flexible fuel system.

Referring to FIG. 1, a flexible fuel system 20 is used within an aircraft, vehicle, or other system. The example flexible fuel system 20 includes a fuel tank 24, a boost pump 26, a fuel properties sensor 28, a main fuel pump 30, one or more heat exchangers 32*a-c*, and a main fuel throttle valve (MFTV) 40. The flexible fuel system 20 communicates a flow of fuel from the fuel tank 24 to a combustor 36 of a gas turbine engine 34 along a conduit or path 37. A Full Authority Digital Engine Control (FADEC) 38, or other control module, communicates with at least the fuel properties sensor 28 and the MFTV 40 to control the delivery rate of the different types of fuels along the path 37 to the combustor 36.

The flexible fuel system 20 contains other systems and components, such as a gear pump 41, hydraulics 42 and seals, that facilitate delivery of the fuel to the combustor 36.

The flexible fuel system designed to accommodate different types of fuels that have differing viscous and lubricating properties. That is, in this example, the systems and components of the flexible fuel system 20 will accommodate, pump, and meter many different types of fuels.

In this example, the main fuel pump 30 is an electric fuel pump that allows for pumping and metering as a function of engine demand, as well as a function of fuel characteristics. The FADEC 38 controls the main fuel pump 30 based on the fuel characteristics. The main fuel pump 30 compensates for variable fuel properties and is resistant to changes in viscosity or lubricity.

A thermal management portion of the example flexible fuel system 20 includes the one or more heat exchangers 32*a*-32*c* that heat the fuel to the maximum temperature allowable without the formation of coke. Some other examples may also include a fuel stabilization unit that is used to inhibit the formation of coke. In this example, the heat exchangers 32*a*-32*c* allow for the introduction of heat into the fuel, based on the allowable temperature limit of the particular fuel. The delivery of heated fuel to the combustor 36 thereby extracts the most energy from the fuel, yet maintains the cleanest burn and lowest emissions. One or more of the heat exchangers 32*a*-32*c* may be a buffer air cooler.

The heat exchangers 32*a*-32*c* adjust the temperature of the fuel depending on the type of fuel that is being delivered. Adjusting the fuel temperature based on the fuel enables delivering the fuel at that type of fuel's optimum temperature so that the fuel burns with, for example, minimal release of $CO_2$ or $NO_x$ emissions, optimum performance, or a desired combination thereof. The FADEC 38 controls the temperature adjustments made by the heat exchangers 32 based on characteristics of the fuel that is being delivered to the combustor 36.

The flexible fuel system 20 senses characteristics of the fuel during operation of the engine 34. The sensed characteristics help the FADEC 38 determine an appropriate adjustment to the temperature of the fuel. The example FADEC 38, or another module, also meters the fuel delivered to the combustor 36 to accommodate different energy densities associated with each of the different types of fuel.

In this example, the fuel properties sensor 28 is operable to identify at least the energy content in the fuel being delivered to the combustor 36. The fuel properties sensor 28 provides the FADEC 38 with sufficient information to meter the flow of the fuel to the combustor 36 by adjusting the position of the main fuel throttle MFTV 40 in response to the energy content sensed in the fuel.

In one specific example, the type of fuel being delivered to the combustor 36 is a blend of fuels that is not known when the aircraft is fueled. The FADEC 38 adjusts the MFTV 40 in real time in response to information about the blend of fuels provided by the sensor 28. The particular blend may change over time, and the FADEC 38 responds to these changes, for example. The different fuel types may include an aviation fuel, a jet fuel, a bio-based fuel, or some blend of these. In general, reciprocating piston engines use aviation fuel, and turbine engines use jet fuel. One example aviation fuel is AVGAS100/130. Example jet fuels include J-4, Jet A, Jet-1, and Jet B.

The example sensor 28 is an energy density compensator that includes a fuel density meter. The fuel density meter measures fuel density properties to determine the energy characteristics of the type of fuel being communicated to the combustor 36. The energy characteristics are communicated to the FADEC 38 in real time.

The example sensor 28 generally determines the energy characteristics by using some combination of the coriolis vibration effect, fuel density measurement using electrical capacitance, carbon dioxide detection and speed of sound sensing, optical BTU measurement, or other technologies. The FADEC 38 readily adjusts fuel metering in response to the measurements to accommodate changes to the type of fuel in real time.

It should be understood that various other operations may also be provided by the sensor 28. Other examples of sensing technologies that may be scaled and ruggedized for aerospace applications include chromatography, acoustic resonance, calorimetry, and catalytic reaction monitoring.

Density measurements may also use temperature compensation to correct for volume-based calculations. Alternatively, the sensor 28 or other elements of the flexible fuel system 20 may incorporate a mass-flow meter for use in conjunction with real-time estimates of energy content of the fuel on a mass basis as calculated by the FADEC 38.

Also, the sensor 28 can be located elsewhere within the flexible fuel system 20 and can be combined with other elements. For example, the sensor 28 can be located in a common housing or integrated with the boost pump 26, the main fuel pump 30, or the MFTV 40.

The example sensor 28 includes power and data interfaces with the FADEC 38. On command, the fuel properties sensor 28 measures fuel properties and communicates the data back to the FADEC 38. The FADEC 38 compares the fuel energy density data against baseline fuel properties (e.g., JP-8). The difference is calculated and passed to the MFTV 40 as a command to open or close as required to maintain baseline engine performance regardless of the fuel characteristics.

As can be appreciated, periodic monitoring of the fuel density ensures that performance is maintained even as fuel characteristics change over time due to mixing in the tank or refueling in flight or on the ground.

Figure 2:
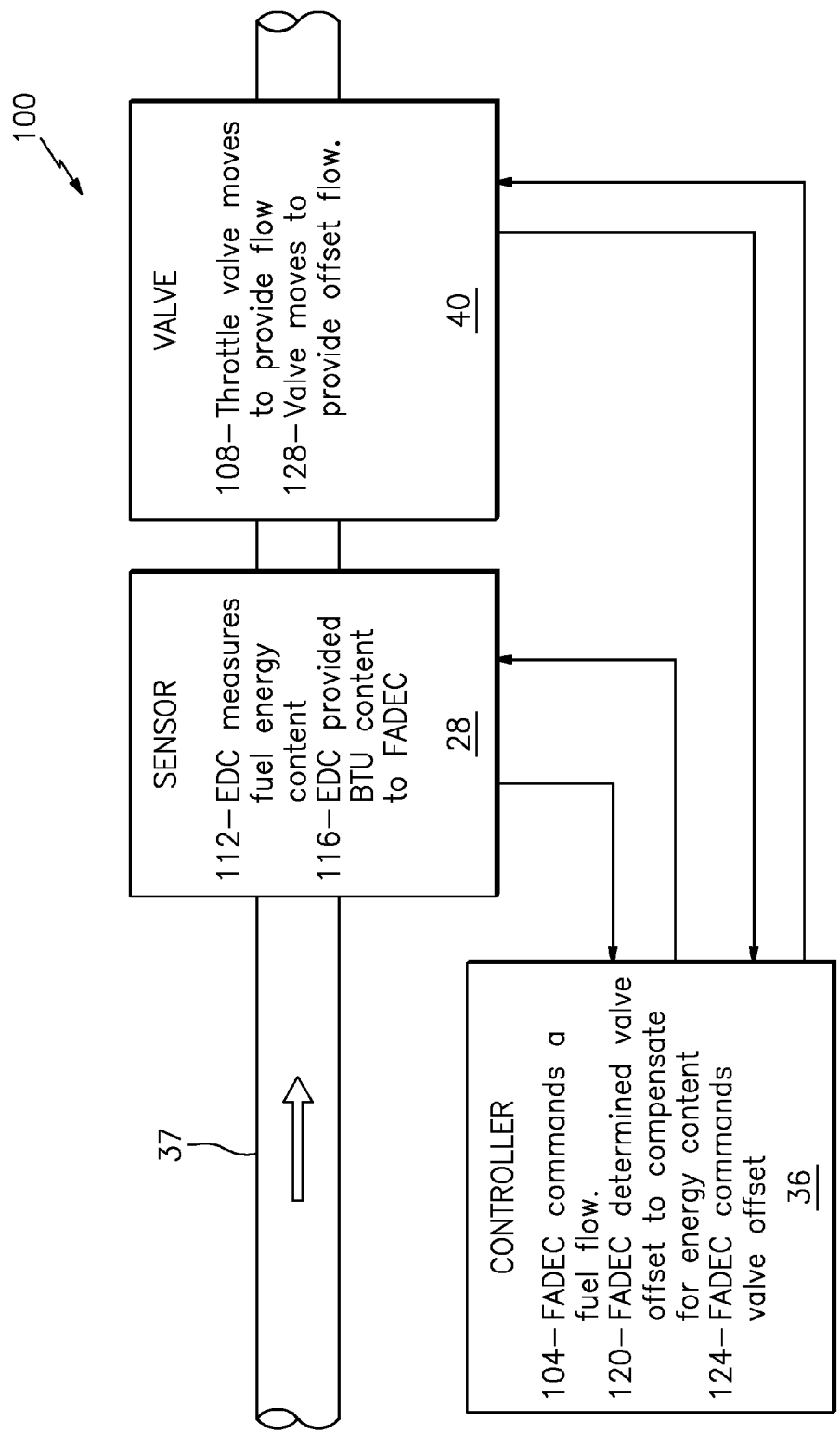
FIG. 2 is a schematic view of a FADEC interaction with an energy density compensator within a fuel flow path.

Referring to FIG. 2 with continuing reference to FIG. 1, an example fuel delivery method 100 includes a step 104 of commanding a flow of fuel using the FADEC 38. The MFTV 40 then moves to a first position that provides flow at a step 108. At a step 112, the sensor 28 measures the energy content within the flow of fuel. The sensor provides the energy content to the FADEC 38 at a step 116. In response, the FADEC 38, at a step 120, determines an appropriate offset of the MFTV 40 to compensate for the energy content. The FADEC 38 commands the MFTV 40 to offset at a step 124. The MFTV 40 moves in response to the command at a step 128.

Although particular step sequences are shown, described, and claimed, it should be understood that steps may be performed in any order, separated or combined.

Further, as understood by those having skill in the art, and the benefit of this disclosure, the functions described in the method 100 may be enacted in either dedicated hardware circuitry or programmed software routines capable of execution in a microprocessor-based electronics control embodiment. For example, the FADEC 38 may be a portion of a flight control computer, a portion of a central vehicle control, an interactive vehicle dynamics module, a stand-alone line replaceable unit or other such control module.

Features of the disclosed examples include a flexible fuel system that is configured to deliver the different types of fuels to a combustor while providing precise fuel metering and thermal management of the engine and of components within the engine. The flexible fuel system provides safe and reliable engine control for different types of fuels, such as standard jet fuels, alternative fuels, and blends of fuels.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A fuel system comprising:
a fuel sensor configured to sense at least one characteristic of a fuel provided to an engine, the fuel selected from a plurality of different fuel types;
a controller configured to meter the fuel in response to the at least one characteristic of the fuel; and
at least one heat exchanger, the controller configured to adjust the temperature of the fuel provided to the engine using the heat exchanger, the adjustments to temperature made in response to the at least one characteristic, wherein the plurality of different fuel types comprises an aviation fuel, a jet fuel, a bio-based fuel, or some blend of these, wherein the controller comprises a full authority digital engine control.

2. A fuel system comprising:
a fuel sensor configured to sense at least one characteristic of a fuel provided to an engine, the fuel selected from a plurality of different fuel types;
a controller configured to meter the fuel in response to the at least one characteristic of the fuel;
at least one heat exchanger, the controller configured to adjust the temperature of the fuel provided to the engine using the heat exchanger, the adjustments to temperature made in response to the at least one characteristic, wherein the plurality of different fuel types comprises an aviation fuel, a jet fuel, a bio-based fuel, or some blend of these, wherein the at least one characteristic comprises the energy density of the fuel provided to the engine, wherein the fuel sensor comprises a fuel density meter that measures fuel density properties to determine the energy density.

* * * * *